(12) United States Patent
Falconetti et al.

(10) Patent No.: US 9,420,527 B2
(45) Date of Patent: Aug. 16, 2016

(54) TRAFFIC CHARACTERISTIC BASED SELECTION OF SERVING BASE STATION

(75) Inventors: Laetitia Falconetti, Aachen (DE); Michael Meyer, Aachen (DE); Min Wang, Luleå (SE); Stefan Wänstedt, Luleå (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 172 days.

(21) Appl. No.: 14/360,737

(22) PCT Filed: Nov. 28, 2011

(86) PCT No.: PCT/EP2011/071211
§ 371 (c)(1),
(2), (4) Date: May 27, 2014

(87) PCT Pub. No.: WO2013/079090
PCT Pub. Date: Jun. 6, 2013

(65) Prior Publication Data
US 2014/0329516 A1    Nov. 6, 2014

(51) Int. Cl.
*H04W 48/20* (2009.01)
*H04W 28/02* (2009.01)
*H04W 36/30* (2009.01)
*H04W 84/04* (2009.01)

(52) U.S. Cl.
CPC .......... *H04W 48/20* (2013.01); *H04W 28/0215* (2013.01); *H04W 36/30* (2013.01); *H04W 84/042* (2013.01)

(58) Field of Classification Search
CPC .......... H04W 72/0413; H04W 72/042; H04W 72/04; H04W 72/06; H04W 24/08; H04W 48/20; H04W 36/08; H04W 36/30
See application file for complete search history.

(56) References Cited

U.S. PATENT DOCUMENTS 6,993,332 B2    1/2006    Pederson et al.
2003/0073455 A1    4/2003    Hashem et al.

FOREIGN PATENT DOCUMENTS

GB    2391755 A    2/2004
WO    2012113448 A1    8/2012

OTHER PUBLICATIONS

Landstrom, S. et al., "Heterogeneous Networks—increasing cellular capacity", Expanding mobile network capacity, Ericsson Review, Jan. 1, 2011, pp. 1-6.
Dahlman, E. et al., "3G Evolution HSPA and LTE for Mobile Broadband", Jul. 31, 2007, p. 474, 2nd edition, Academic Press.
(Continued)

*Primary Examiner* — Nam Huynh
(74) *Attorney, Agent, or Firm* — Coats & Bennett, PLLC

(57) ABSTRACT

For the purpose of selecting a base station (110, 120) to be used as a serving base station of a mobile terminal (100), a traffic characteristic of the mobile terminal (100) is determined. The traffic characteristic may in particular be indicative of an asymmetry between downlink and uplink data traffic of the mobile terminal (100). On the basis of the traffic characteristic, a selection between a first mode and a second mode is performed. In the first mode the base station (110, 120) to be used as the serving base station is selected on the basis of its downlink radio capacity as compared to one or more other base stations (110, 120). In the second mode the base station (110, 120) to be used as the serving base station is selected on the basis of its uplink radio capacity as compared to one or more other base stations (110, 120).

19 Claims, 6 Drawing Sheets

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 8)", Technical Specification, 3GPP TS 36.331 V8.10.0, Jun. 1, 2010, pp. 1-211, 3GPP, France.

3rd Generation Partnership Project, "3rd Generation Partnership Project; Technical Specification Group Radio Access Network; Requirements for Evolved UTRA (E-UTRA) and Evolved UTRAN (E-UTRAN) (Release 7)", Technical Report, 3GPP TR 25.913 V7.3.0, Mar. 1, 2006, pp. 1-18, 3GPP, France.

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 8)", Technical Specification, 3GPP TS 36.423 V8.6.0, Jun. 1, 2009, pp. 1-100, 3GPP, France.

Ericsson, "Intra-LTE handover optimization", 3GPP TSG-RAN WG2 #57-bis, St. Julian, Malta, Mar. 26, 2007, pp. 1-6, Tdoc R2-071290, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Technical Specification, 3GPP TS 36.300 V8.10.0, Sep. 1, 2009, pp. 1-147, 3GPP, France.

TRAFFIC CHARACTERISTIC BASED SELECTION OF SERVING BASE STATION

TECHNICAL FIELD

The present invention relates to methods for selecting a serving base station of a mobile terminal and to corresponding devices.

BACKGROUND

In mobile networks, such as 3GPP networks (3GPP: Third Generation Partnership Project) there is a continuing need for higher throughputs. In uplink (UL) communication, i.e., in communication from a mobile terminal to the network, transmit (Tx) power limitations in mobile terminals and constraints on the UL budget mean that such higher throughputs typically necessitate smaller cell sizes than is typically deployed for present cellular systems. For example, in heterogeneous networks, also referred to as HetNet, conventional base stations (BSs), referred to as Macro BSs, are complemented by further BSs, which are usually deployed closer to the end users, e.g., on street level. As compared to the Macro BSs, these further BSs typically transmit at a lower power. In the following, these further BSs will also be referred to as Pico BSs. The Pico BSs can use carrier frequencies from the same spectrum as the Macro BSs or may use carrier frequencies from another spectrum.

In current cellular networks, e.g., 3GPP Long Term Evolution (LTE), selection of a serving BS, also referred to as cell association, is based on a Reference Signal Received Power (RSRP) measurement by the mobile terminal. That is to say, the respective RSRPs as measured for different BSs are used as a basis for selecting a BS to act as the serving BS of the mobile terminal. If the selected serving BS is different from the present serving BS of the mobile terminal, a handover of the mobile terminal to the selected BS may be initiated. The serving BS typically sends downlink (DL) transmissions to the mobile terminal and receives UL transmissions from the mobile terminal.

The RSRP depends on the Tx power of the respective BS. In the case of a heterogeneous network deployment, there may be a large imbalance in the Tx power between a Macro BS and a Pico BS. Specifically, Macro BSs usually transmit at a high Tx power level, e.g., 46 dBm, whereas Pico BSs may use a much lower Tx power level, e.g., 30 dBm, or even less. Thus, the difference in Tx power between transmitted reference signals can be 16 dB or more. The RSRP is indicative of a DL channel quality between the BS and the mobile terminal. As compared to that, the UL channel quality between the mobile terminal and the BS depends on the signal damping, also referred to as pathloss, between the mobile terminal and the BS.

In conventional homogeneous networks, the BS that provides the highest RSRP is typically identical to the BS that yields the lowest average pathloss. However, this is not necessarily the case in heterogeneous networks. The imbalance in the Tx power among the different types of BSs may lead to a situation where a mobile measures a higher RSRP from a Macro BS, although it is located closer to a Pico BS and its pathloss to the Pico BS is smaller than the pathloss to the Macro BS. In this case, it would be preferable for the mobile terminal to receive data from the BS with the highest RSRP, i.e., from the Macro BS. On the other hand, it would be preferable for the mobile terminal to transmit data to the BS with the lowest pathloss, i.e., to the Pico BS. Accordingly, in a heterogeneous network conventional RSRP-based BS selection may result in suboptimal performance. Imbalances between DL and UL performance may however also exist in homogeneous networks.

Accordingly, in heterogeneous networks as mentioned above, but also in homogeneous networks, there is a need for techniques which allow for efficiently balancing performance of a mobile terminal in the UL and the DL.

SUMMARY

According to an embodiment of the invention, a method of selecting a base station to be used as a serving base station of a mobile terminal is provided. According to the method, a traffic characteristic of the mobile terminal is determined. On the basis of the traffic characteristic, a selection between a first mode and a second mode is performed. In the first mode the base station to be used as the serving base station is selected on the basis of its downlink radio capacity as compared to one or more other base stations. In the second mode the base station to be used as the serving base station is selected on the basis of its uplink radio capacity as compared to one or more other base stations.

According to a further embodiment of the invention, a base station is provided. The base station comprises a radio interface for sending downlink transmissions to the mobile terminal and for receiving uplink transmissions from the mobile terminal. The base station further comprises a processor. The processor is configured to select a base station to be used as a serving base station of the mobile terminal. For this purpose, the processor is configured to determine a traffic characteristic of the mobile terminal and, on the basis of the traffic characteristic, select between a first mode and a second mode. In the first mode the processor is configured to select the base station to be used as the serving base station on the basis of its downlink radio capacity as compared to one or more other base stations. In the second mode the processor is configured to select the base station to be used as the serving base station on the basis of its uplink radio capacity as compared to one or more other base stations.

According to further embodiments, other methods, devices, or computer program products including program code to be executed by a processor for implementing the methods may be provided.

DETAILED DESCRIPTION OF EMBODIMENTS

In the following, the invention will be explained in more detail by referring to exemplary embodiments and to the accompanying drawings. The illustrated embodiments relate to concepts of selecting a serving base station of a mobile terminal. As used herein, the serving base station of a mobile terminal is the base station which controls transmissions to and from the mobile terminal. Typically, the serving base station will send DL transmissions to the mobile terminal and receive UL transmissions from the mobile terminal. In the illustrated examples, it will be assumed that DL and UL communication is implemented according to 3GPP LTE. However, it is to be understood that the illustrated concepts may also be applied in other types of mobile networks, e.g., in a GSM (Global System for Mobile Communications) network, in a UMTS (Universal Mobile Telecommunications System) network, or in a network combining GSM, UMTS, and/or LTE radio access technology.

Figure 1:
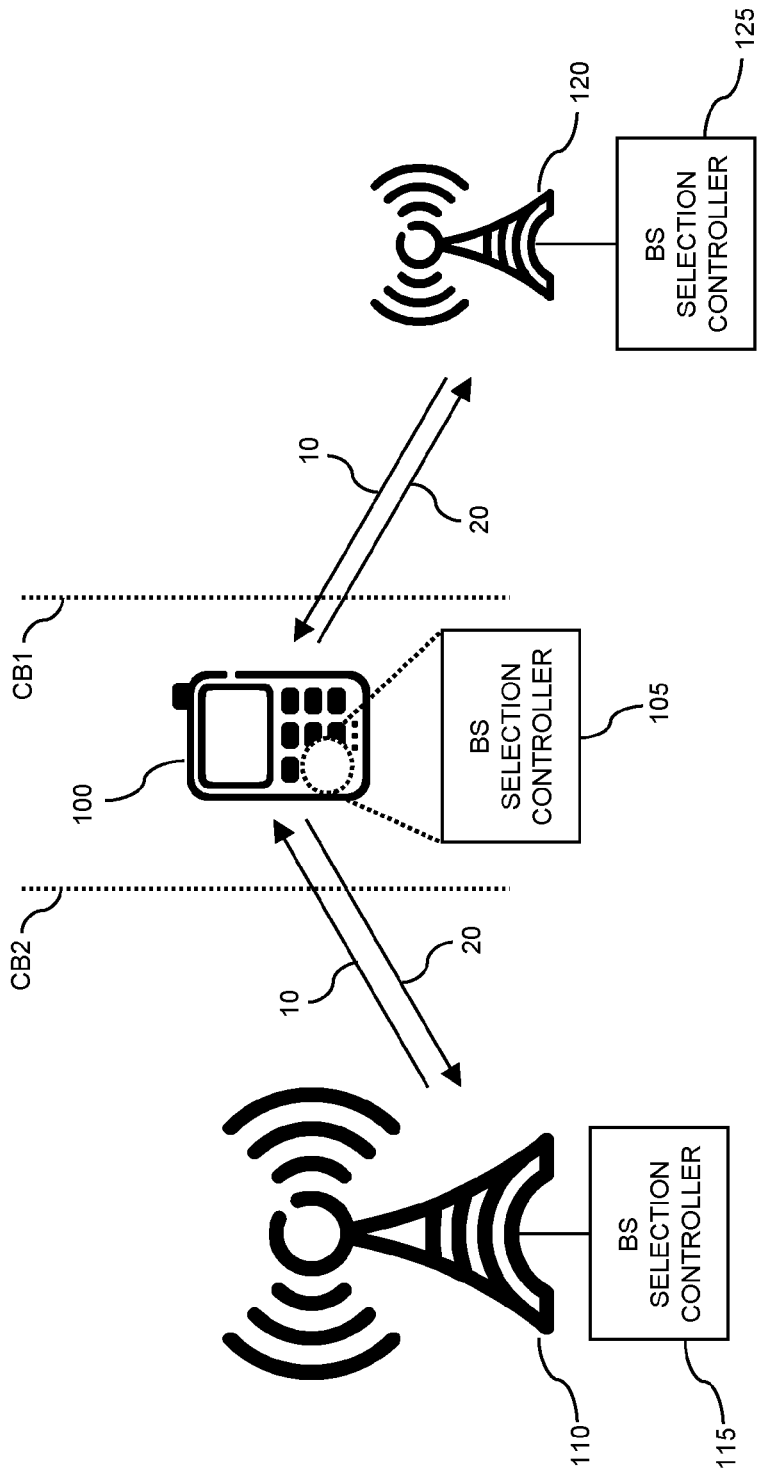
FIG. 1 schematically illustrates a mobile network environment in which concepts according to an embodiment of the invention can be applied for selecting a serving base station.

FIG. 1 schematically illustrates a mobile network environment, i.e., infrastructure of a mobile network, represented by a first base station (BS) 110 and a second BS 120, and a mobile terminal 100 to be used in the mobile network. The mobile terminal 100 may be, e.g., a mobile phone, portable computer, or other type of user equipment (UE). In the following, the mobile terminal 100 will also be referred to as UE.

In the illustrated example, the mobile network is based on a heterogeneous network deployment using BSs transmitting at different power levels. In the illustrated example the first BS 110 corresponds to a Macro BS and the second BS 120 corresponds to a Pico BS. This means that the second BS 120 transmits at a lower Tx power than the first BS 110. In accordance with the illustrated 3GPP LTE scenario, the BSs 110, 120 may each correspond to an evolved Node B (eNB) and the DL and UL transmissions 10, 20 may be transmitted across the Uu radio interface. As illustrated, the BS 110 may be provided with a BS selection controller 115 for implementing functionalities of selecting a serving BS as described herein. Similarly, the BS 120 may be provided with a BS selection controller 125 for implementing functionalities of selecting a serving BS as described herein. Furthermore, also the UE 100 may be provided with a BS selection controller 105 for implementing functionalities of selecting a serving BS as described herein.

According to embodiments as explained in the following, two different modes of selecting a serving BS of the UE 100 are provided, and selection between these modes is accomplished on the basis of a traffic characteristic of the UE 100. In a first mode, the serving BS is selected on the basis of a DL radio capacity of the BS as compared to one or more other BSs. In a second mode, the serving BS is selected on the basis of a UL radio capacity of the BS as compared to one or more other BSs.

The traffic characteristic of the UE 100 may in particular be indicative of an asymmetry between UL data traffic and DL data traffic of the UE 100. In this case, if the traffic characteristic indicates a DL oriented asymmetry, e.g., an amount of DL data traffic transmitted to the UE 100 which is larger than an amount of UL data traffic transmitted from the UE 100, the first mode may be selected. On the other hand, if the traffic characteristic indicates a UL oriented asymmetry, e.g., an amount of UL data traffic transmitted from the UE 100 which is larger than an amount of DL data traffic transmitted to the UE 100, the second mode may be selected. The DL radio capacity may for example include or be based on a received signal power of a signal transmitted from the BS to the UE 100, e.g., on the RSRP. The UL radio capacity may for example include or be based on the pathloss between the UE 100 and the BS. However, the DL radio capacity and the UL radio capacity may include other parameters as well. For example, the UL radio capacity may include or be based on an amount of UL radio resources available at the BS and the DL radio capacity may include or be based on an amount of DL radio resources available at the BS.

In the following, selection of the serving BS in the first mode and in the second mode will be further explained by referring to illustrative cell border lines CB1 and CB2 in FIG. 1.

The cell border line CB1 illustrates a cell border between the first and second BSs 110, 120 when assuming a selection mechanism on the basis of DL radio capacities of the BSs 110, 120, e.g., on the basis of the RSRP. In this DL radio capacity based selection mechanism, the BS offering the highest DL radio capacity to the UE 100 would be selected as the serving BS of the UE 100. The DL radio capacity based selection mechanism is favorable in view of DL performance and may be used for implementing the above-mentioned first mode of selecting the serving BS. The cell border line CB2 illustrates a cell border between the first and second BSs 110, 120 when assuming a selection mechanism on the basis of UL radio capacities of the BSs 110, 120, e.g., on the basis of the pathloss between the BS 110, 120 and the UE 100. In this UL radio capacity based selection mechanism, the BS offering the highest UL radio capacity, e.g., the lowest pathloss, would be selected as the serving BS. The UL radio capacity based selection mechanism is favorable in view of UL performance and may be used for implementing the above-mentioned second mode of selecting the serving BS.

In the illustrative scenario of FIG. 1, the UE 100 is located in a transition area between the cell border lines CB1 and CB2. This means that the UL radio capacity based selection mechanism, which is favorable in view of UL performance, would select the second BS 120, whereas the DL radio capacity based selection mechanism, which is favorable in view of DL performance, would select the first BS 110. In this situation, overall performance can be improved by suitably selecting between the first mode and the second mode.

The pathloss from a UE to a BS may be estimated by the difference between the RSRP at the UE and the Tx power at the BS. In this case, it can be seen that the UE 100 being in the transition area between the first BS 110 and the second BS 120 means that the RSRP of the first BS 110, denoted by RSRP1, the RSRP of the second BS 120, denoted by RSRP2, the Tx power of the first BS 110, denoted by PTx1, and the Tx power of the second BS 120, denoted by PTx2, satisfy the relation:

$$RSRP1-RSRP2 \leq PTx1-PTx2. \quad (1)$$

Relation (1) may therefore be used to identify whether a particular UE is located in the transition area between two BSs. The needed RSRPs can be obtained from measurement reports. The Tx powers can be obtained, e.g., from Operations and Maintenance data or by exchanging messages with neighboring BSs.

As mentioned above, the traffic characteristic may be indicative of an asymmetry between UL data traffic and DL data traffic of the UE. If such an asymmetry is detected for a UE in the transition area, the serving BS can be selected to match the traffic characteristic of the UE by suitably choosing the first mode or the second mode.

The asymmetry may be detected by evaluating a traffic pattern of the UE. This may be accomplished on a timescale which depends on the typical time for accomplishing a handover from the present serving BS to a new serving BS. For example, if a handover can be accomplished within about 20 ms, the asymmetry may be detected by evaluating the traffic pattern for at least 20 ms, e.g., for 100 ms or 1 s. If the typical time for accomplishing a handover is shorter, the traffic pattern may be evaluated on shorter timescales.

The detection of the asymmetry may be based on historic values, i.e., values measured in the past, on predicted values, i.e., values expected to apply in the future, or on both historic values and predicted values.

An example of using historic values is to measure amounts of data traffic that was transmitted during a certain time window. This amount of data traffic could be measured on the level of different protocol layers, e.g., on the level of the physical layer, on the level of various link layer protocols such as Media Access Control (MAC), Radio Link Control (RLC), Packet Data Convergence Protocol (PDCP), on the level of the networking layer, e.g., the Internet Protocol (IP), on the level of the transport protocol such as Transport Control Protocol (TCP) or User Datagram Protocol (UDP), and/or on the level of the application layer. Using an evaluation on the level of one or more link layer protocols may be beneficial because radio resource management in the mobile network may be closely interacting with such link layer protocols, which means that an accurate representation of the traffic pattern on the radio link to and from the UE can be obtained.

For obtaining predicted values, a fill level of one or more data buffer used for buffering the data traffic before transmission on the radio link could be observed. A high fill level may indicate that a large amount of traffic will be transmitted in a certain future time interval, and a low fill level may indicate that a small amount of traffic will be transmitted in a certain future time interval.

In the DL the present serving BS can directly observe such data buffers because they would be situated in the serving BS. Here, all data buffers provided for a particular UE could be taken into account. Alternatively, one or more data buffers could be selected for observation, e.g., data buffers used for a dominant type of data traffic to the UE. For example, in addition to logical channels that carry user plane data traffic, also logical channels for control purposes, e.g., carrying Radio Resource Control (RRC) messages, may be provided between the present serving BS and the UE. In such cases, data buffers provided for the logical channels transmitting user plane data traffic could be observed, but not the data buffers provided for the logical channels for control purposes. In the UL, the serving BS could indirectly observe the fill level of the data buffers in the UE by evaluating control data received from the UE. For example, such control data could be provided in the form of buffer-status reports from the UE. Such buffer-status reports may also be used by the serving BS for performing scheduling decisions for the UE.

For obtaining predicted values, also a traffic type transmitted to or from the UE could be observed. For example, if it is observed that the UE starts to receive video traffic, a large amount of data traffic can be expected to be transmitted to the UE in a certain future time interval. The traffic type may for example be identified on the basis of a Quality of Service Class Indicator (QCI) assigned to a logical channel between the present serving BS and the UE.

Figure 2:
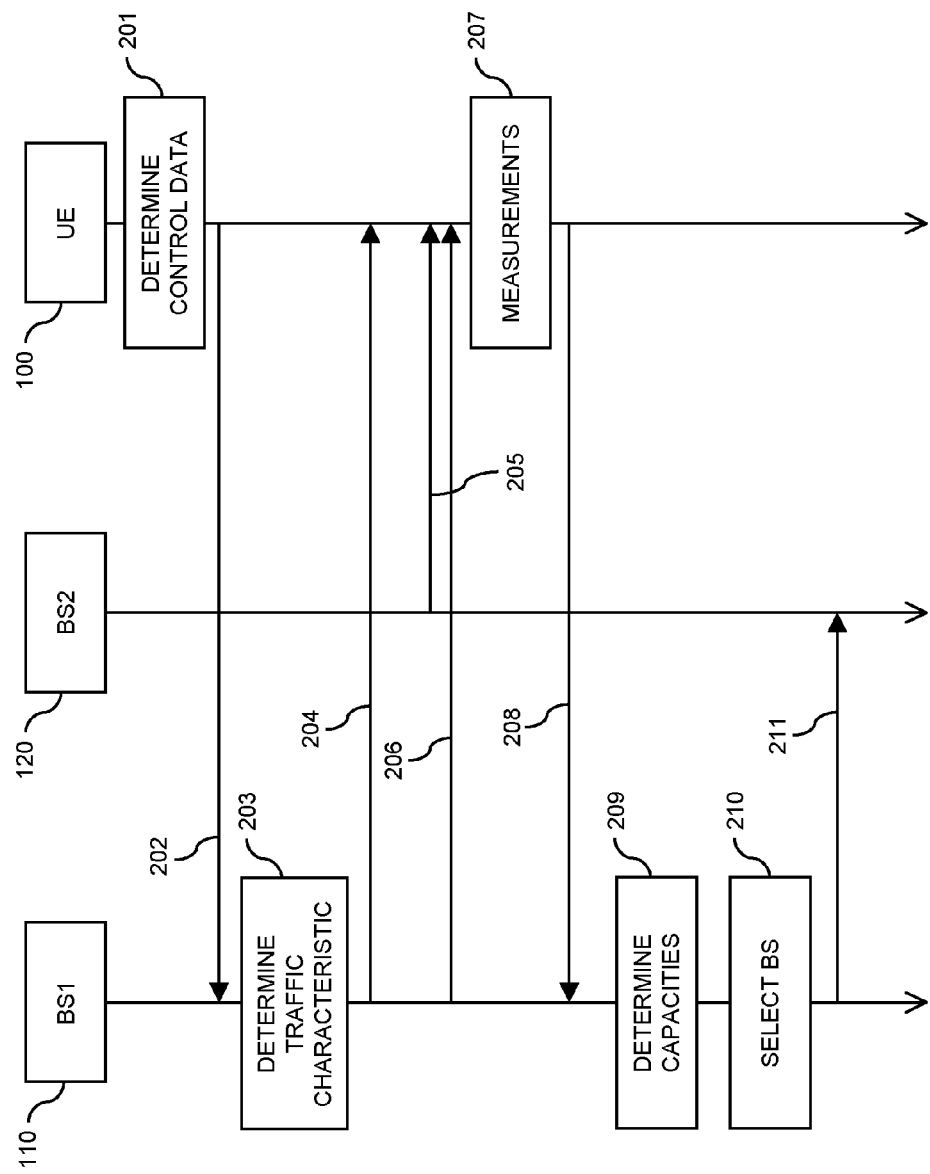
FIG. 2 shows a signaling diagram for illustrating an exemplary process in which selection of a serving base station is accomplished in accordance with an embodiment of the invention.

FIG. 2 shows a signaling diagram for schematically illustrating a process for selecting a serving BS of the UE 100. In this process, it is assumed that initially the BS 110 is the serving BS of the UE 100. Further, it is assumed that the UE 100 was identified as a transition UE for which the BS 110 offers the higher DL radio capacity and the BS 120 offer the higher UL radio capacity. This identification may be accomplished as explained above using relation (1).

At step 201 the UE 100 determines control data. For example, the UE 100 may perform measurements and generate one or more report to be transmitted to its serving BS, i.e., to the BS 110. In the illustrated scenario, it is assumed that the determination of control data also includes generating a buffer status report. The buffer status report may indicate a fill level of UL data buffers in the UE 100. In message 202, the control data are transmitted to the serving BS 110. For example, the message 202 may include a MAC control element with the buffer status report.

At step 203, the serving BS 110 determines a traffic characteristic. The traffic characteristic is indicative of an asymmetry between UL data traffic and DL data traffic of the UE 100. For this purpose, the serving BS 110 utilizes the control data as received from the UE 100 and locally available data. In particular, the serving BS 110 may utilize the fill level of UL data buffers as indicated by the received buffer status report and the fill levels of DL data buffers provided at the serving BS 110 for buffering DL data traffic to be transmitted to the UE 100.

In the following, an example of an algorithm for determining the traffic characteristic will be explained in more detail. The algorithm is based on averaged fill levels of DL and UL data buffers.

In this algorithm, the instantaneous fill level of one or more DL data buffer, referred to as inst_DL_buff, is directly available to the serving BS 110. By observing this instantaneous fill level, the serving BS 110 may compute an average fill level of the DL data buffer, referred to as mean_DL_buff, for time t+1. This is accomplished on the basis of the instantaneous DL buffer size at time t and the average DL buffer at time t. A time-domain filter can be applied for this purpose, e.g., by computing the average fill level of the DL data buffer according to:

$$\text{mean\_DL\_buff}(t+1) = \beta \text{mean\_DL\_buff}(t) + (1-\beta)\text{inst\_DL\_buff}(t) \quad (2),$$

where $\beta$ is a parameter of the time-domain filter with $0 \leq \beta \leq 1$.

In the UL, it is assumed that the UE 100 reports its buffer status to its serving BS, e.g., in response to being assigned a valid grant for a UL transmission. As mentioned above, this may be accomplished by sending a buffer status report. The buffer status report may for example be included in a MAC control element which is transmitted on an UL data channel, e.g., in message 202. A buffer-size field in the buffer-status report may indicate the amount of data awaiting transmission across all logical channels of a group of logical channels, i.e., an instantaneous fill level of UL data buffers in the UE 100, referred to as inst_UL_buff. By observing buffer status reports from the UE 100, the serving BS 110 may compute an average fill level of the UL data buffers, referred to as mean_UL_buff, for time t+1. This is accomplished on the basis of the instantaneous fill level of the UL data buffers at time t and the average fill level of the UL data buffers at time t. A time-domain filter can be applied for this purpose, e.g., by computing the average fill level of the UL data buffers according to:

$$\text{mean\_UL\_buff}(t+1) = \beta \text{mean\_UL\_buff}(t) + (1-\beta)\text{inst\_UL\_buff}(t). \quad (3)$$

Depending on the value given to the parameter $\beta$, the contribution of the past fill levels on the computed average DL and UL fill levels can be adjusted. A value of $\beta$ close to 1, e.g., of 0.9, may be used to avoid frequent changes of the average fill levels on a timescale of a few ms.

On the basis of the computed average DL and UL fill levels, the traffic characteristic may then be computed as asymmetry value AV given by a ratio of the average UL fill level to the average DL fill level:

$$AV = \text{mean\_UL\_buff} / \text{mean\_DL\_buff}. \quad (4)$$

As illustrated by message 204, the serving BS 110 may then report the determined traffic characteristic to the UE 100.

In order to determine whether the presently selection of the serving BS is appropriate, UL and DL radio capacities are determined. For this purpose, the BSs 110, 120 may transmit reference signals which can be used at the UE 100 for measurements 207. In particular, the measurements 207 may be used to determine RSRP values and/or pathloss values for the BSs 110, 120. The UE 100 may then send message 208 to its serving BS 110 to report the measurement results. In some scenarios, the type of measurements performed by the UE 100 may be selected depending on the determined traffic characteristic, e.g., as indicated in message 204. For example, if the traffic characteristic indicates a DL oriented asymmetry, the measurements 207 could be adapted to determine RSRP values for the BSs 110, 120, and if the traffic characteristic indicates a UL oriented asymmetry, the measurements 207 could be adapted to determine pathloss values for the BSs 110, 120. The message 204 could also include control data to instruct the UE 100 to perform certain types of measurements.

At step 209, the serving BS 110 determines the DL radio capacities and/or the UL radio capacities for the BSs 110, 120. These radio capacities are then used as the basis for selecting the serving BS for the UE 100 at step 210, i.e., to decide whether the selection of the BS 110 as the serving BS is still appropriate or if the BS 120 should be selected and a handover initiated.

Depending on the traffic characteristic, the serving BS 110 may either use a first mode or a second mode for performing the selection. In the first mode, the selection is based on the DL radio capacities, and in the second mode the selection is based on the UL radio capacities. If the traffic characteristic indicates a DL oriented asymmetry, the first mode may be selected, and if the traffic characteristic indicates a UL oriented asymmetry, the second mode may be selected. As mentioned above, the determination of the radio capacities at step 209 may be based on the traffic characteristic as well. For example, if the traffic characteristic indicates a DL oriented asymmetry and the first mode is selected, the DL radio capacities may be determined at step 209, and if the traffic characteristic indicates a UL oriented asymmetry and the second mode is selected, the UL radio capacities may be determined at step 209.

The selection between the first mode and the second mode may be accomplished by comparing the asymmetry value AV to one or more parameters.

For example, if the asymmetry value AV is smaller than a configurable parameter $\delta$ with $0<\delta<1$, the first mode may be selected, which means that the BS offering the higher DL radio capacity is selected. This may for example result in the selection of a Macro BS as the serving BS, because the DL signals from the Macro BS are received with larger power than the DL signals from a Pico BS. Since in the illustrated scenario, the BS 110 is a Macro BS and the BS 120 is a Pico BS, the BS 110 may offer higher DL radio capacity than the BS 120. Therefore, the selection of the BS 110 as the serving BS could be confirmed at step 210 and no handover need to be initiated.

On the other hand, if the asymmetry value AV is larger than a configurable parameter $\alpha$ with $0<\alpha<1$, the second mode may be selected, which means that the BS offering the higher UL radio capacity is selected. This may for example result in the selection of a Pico BS as the serving BS, because the UL signals from the UE 100 as received by the Pico BS are subjected to lower pathloss than those received by the Macro BS. Since in the illustrated scenario, the BS 110 is a Macro BS and the BS 120 is a Pico BS, the BS 120 may offer higher UL radio capacity than the BS 110. Therefore, the BS 120 could be selected as the serving BS at step 210, and a handover from the BS 110 to the BS 120 be initiated. The handover may be initiated by the BS 110 by sending a handover request message 211 to the BS 120.

Accordingly, in the process of FIG. 2, the selection of the serving BS is based on the traffic characteristic, in the form of the asymmetry value AV, and on either DL radio capacities or UL radio capacities of the relevant BSs.

The above selection criteria could be adapted so as to allow for better taking into account certain scenarios. For example, in certain deployments, in particular in a HetNet where the UE is close to the Macro BS, it may take very long to drain a small UL buffer whereas a large DL buffer can be served quickly. This could be taken into account by further basing the asymmetry value AV on capabilities of the BS, i.e., in the form of a theoretical throughput or link budget. For example, link adaptation algorithms of the serving BS could be used to determine a theoretical data rate which can be achieved for DL transmissions from the UE, e.g., by assuming that all available radio resources are given to this UE, and the average DL or UL fill level could be normalized with this theoretical data rate.

Further, as an alternative or in addition to measuring the average DL and UL fill levels, an average throughput, e.g., in the form of a measured average data rate, and/or an average resource utilization value, e.g., in the form of an average percentage of available radio resources which are actually used, could be measured for the UE in the DL and UL. The above average DL and UL fill levels could then be normalized with the measured average throughput or average link utilization.

Accordingly, the asymmetry value AV could be calculated according to:

$$AV = \text{norm\_UL\_buff}/\text{norm\_DL\_buff}. \qquad (5)$$

In equation (5), norm_DL_buff is a normalized average DL fill level calculated on the basis of a theoretical or measured DL throughput TP_DL and/or a DL resource utilization value RU_DL according to:

$$\text{norm\_DL\_buff} = \text{mean\_DL\_buff}/(TP\_DL \times RU\_DL), \qquad (6)$$

and norm_UL_buff is a normalized average UL fill level calculated on the basis of a theoretical or measured UL throughput TP_UL and/or a UL resource utilization value RU_UL according to:

$$\text{norm\_UL\_buff} = \text{mean\_DL\_buff}/(TP\_UL \times RU\_UL). \qquad (7)$$

When using measured throughputs and/or resource utilizations, it is possible to take into account what the UE was actually allowed to transmit, which allows for obtaining accurate results, in particular in highly loaded cells. As compared to that, the theoretical data rate may be quickly available without performing measurements, which can be beneficial at the beginning of data transmission to or from the UE.

In order to avoid frequent handover procedures, the selection between the first mode and the second mode may be additionally based on a timer. This timer could be started when the asymmetry value AV first meets one of the above-mentioned conditions. If the asymmetry value AV continuously meets the same condition until the timer elapses, the serving BS may switch between the first mode and the second mode, which may result in initiating a handover. If the condition changes before the timer elapses, the timer may be restarted.

Figure 3:
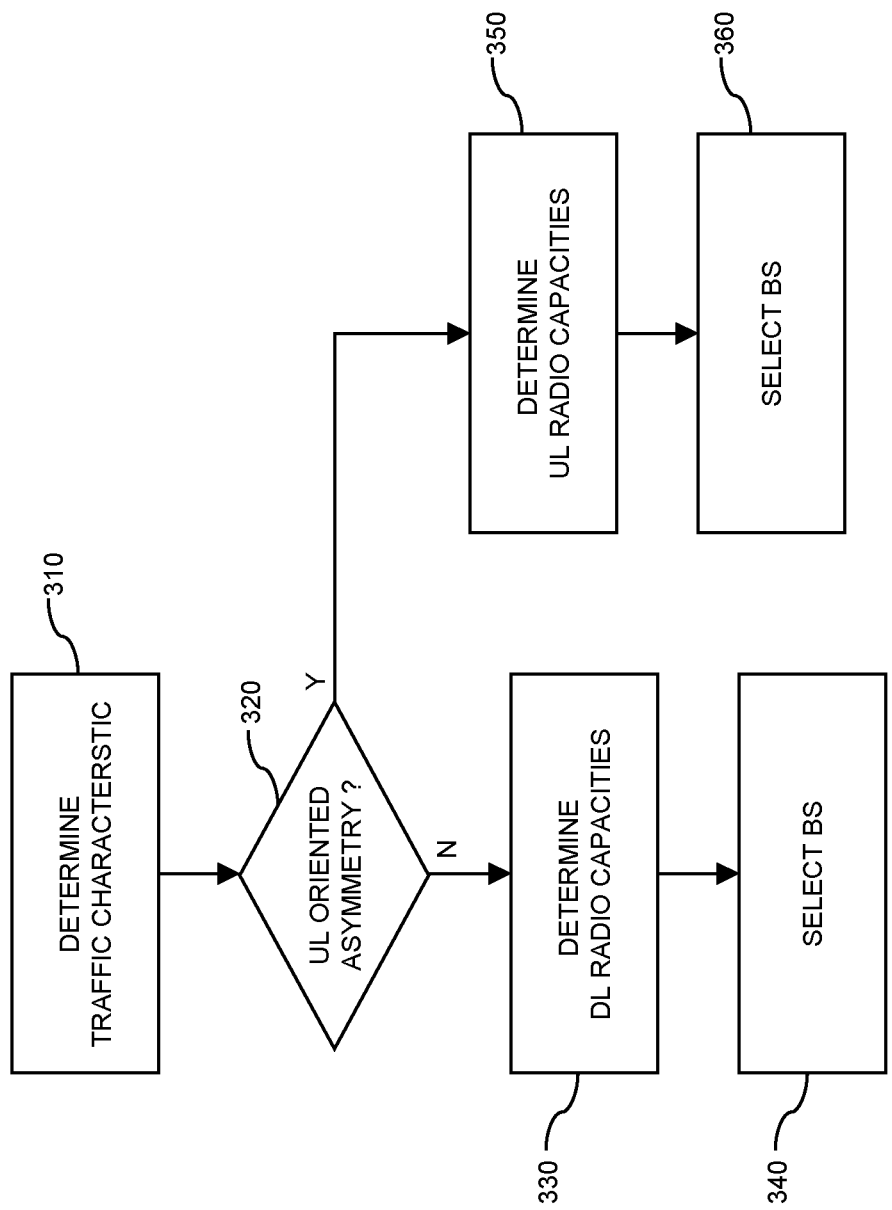
FIG. 3 shows a flowchart for illustrating a method according to an embodiment of the invention.

FIG. 3 shows a flowchart for schematically illustrating a method according to an embodiment of the invention. The method may be used in a mobile network for selecting the serving BS of a UE, e.g., for selecting whether the BS 110 or the BS 120 is to be used as the serving BS of the UE 100. The method may be implemented by a BS selection controller in a control node of a mobile network or in the UE, e.g., in the BS selection controller 105, 115, 125 as illustrated in FIG. 1. For example, in an LTE implementation the BSs of the mobile network correspond to eNBs and may include such a BS selection controller. Accordingly, in some scenarios, the method may be implemented in a present serving BS of the UE to select a new serving BS of the UE or to confirm the present selection. In a UMTS implementation of the mobile network, the BS selection controller may be implemented iny a Radio Network Controller (RNC) of the mobile network, and in a GSM implementation, the BS selection controller may be implemented by a Base Station Controller (BSC) of the mobile network. In other types of mobile networks, corresponding control entities may exist and be used for implementing the method.

At step 310, a traffic characteristic of the UE is determined. The traffic characteristic may be determined by the present serving BS of the UE or by a control node of the mobile network. Alternatively, the traffic characteristic could also be determined by the UE or some other entity. The traffic characteristic may in particular be indicative of an asymmetry between DL data traffic and UL data traffic of the UE. For this purpose, the traffic characteristic may for example include the above-described asymmetry value AV.

In the method of FIG. 3, the traffic characteristic as determined at step 310 is used for selection between a first mode of selecting the serving BS and a second mode for selecting the serving BS. In particular, as illustrated by step 320, this may involve determining whether the traffic characteristic indicates a UL oriented asymmetry. If the traffic characteristic does not indicate a UL oriented asymmetry, or if the traffic characteristic indicates a DL oriented asymmetry, the first mode is selected and the method continues with steps 330 and 340, as indicated by branch "N". If the traffic characteristic indicates a UL oriented asymmetry the second mode is selected and the method continues with steps 350 and 360, as indicated by branch "Y".

As mentioned above, the traffic characteristic may be determined from amounts of data transmitted to and from the UE during a period of time or time window. In order to be compatible with typical handover times in the mobile network, this period of time may be 20 ms or longer, e.g., 100 ms or 1 s.

As further mentioned above, the traffic characteristic may be determined from fill levels of buffers used for storing DL data and UL data, e.g., a first fill level of a buffer for storing DL data to be transmitted to the UE and a second fill level of a buffer for storing UL data to be transmitted from the UE. The second fill level may be determined from a buffer status report transmitted from the UE and received by the present serving BS of the UE.

For determining the traffic characteristic, the first fill level and the second fill level may be averaged, e.g., using time domain filtering such as given by equations (2) and (3), and the traffic characteristic may then be determined from the averaged fill levels, e.g., using equation (4). The fill levels may also be normalized with data rates or resource utilization values and the traffic characteristic may then be determined from normalized fill levels, e.g., using equations (5), (6) and (7). Averaging and normalization of the fill levels may be combined or may be used separately.

For determining the asymmetry between DL and UL data traffic of the UE, also a quality of service class of a service used at the UE may be taken into account, e.g., as indicated by a QCI used during radio link establishment.

In the first mode, the serving BS is selected on the basis of its DL radio capacity as compared to one or more other BSs. For this purpose, DL radio capacities may be determined at step 330 and the BS selected on the basis of these DL radio capacities at step 340. For example, the DL radio capacity may be based on a received signal power of a signal transmitted from the BS to the UE, e.g., a RSRP. The DL radio capacity may also be based on an amount of DL radio resources which are available at the BS, e.g., in the form of time and/or frequency resources which can be allocated to the UE. Accordingly, the BS offering the highest RSRP and/or the highest amount of available DL resources may be selected in the first mode.

In the second mode, the serving BS is selected on the basis of its UL radio capacity as compared to one or more other BSs. For this purpose, UL radio capacities may be determined at step 350 and the BS selected on the basis of these UL radio capacities at step 360. For example, the UL radio capacity may be based on a pathloss between the UE and the BS, e.g., as determined from a received signal power and the transmit power of a signal transmitted between the UE and the BS. The UL radio capacity may also be based on an amount of UL radio resources which are available at the base station, e.g., in the form of time and/or frequency resources which can be allocated to the UE. Accordingly, the BS offering the lowest pathloss and/or the highest amount of available UL resources may be selected in the second mode.

If the BS as selected at step 340 or 360 is different from the present serving BS, a handover of the UE to the selected new serving BS may be initiated. This may for example involve sending a handover request message from the present serving BS to the selected new serving BS.

According to some embodiments, triggering of handovers and selection of the serving BS may be controlled on the basis of a handover settings table, which may be stored at the BS or at the UE. The handover settings table may include a number of table items relating handover settings, e.g., a triggering policy or BS selection policy, to corresponding traffic patterns. Accordingly, the handover settings table may be used to select handover settings on the basis of a detected traffic pattern. This may also include the above selection between the first mode and the second mode of selecting the serving BS.

A search in the handover settings table may be initiated by a change in a key traffic pattern of a UE. In other words, a small change of the traffic pattern may not trigger the search, for example if there is merely a change in mean traffic bit rate increases from 200 kbps to 400 kbps or a change in frame interval from 20 ms to 30 ms. As compared to that, a change of the key traffic pattern indicates a qualitative change in the traffic pattern, e.g., a traffic orientation change from UL oriented asymmetry to DL oriented asymmetry, from DL oriented asymmetry to UL oriented asymmetry, or from UL or DL oriented asymmetry to UL-DL symmetry. Such qualitative changes in the traffic pattern may have significant impact on performance, resource consumption, and system robustness. Accordingly, a corresponding adaptation of handover settings can be beneficial.

In the following, some examples of key traffic patterns and corresponding handover settings will be further explained.

According to a first example, the key traffic pattern corresponds to an UL oriented asymmetry, and handover settings to be applied when this key traffic pattern is detected are provided in a corresponding item of the handover settings table.

Accordingly, if the detected traffic pattern indicates an UL oriented asymmetry, the corresponding table item will be selected and the handover settings defined therein be applied. These handover settings may specifically define that the above-mentioned second mode of selecting the serving BS is to be applied. This may specifically mean that the serving BS is selected on the basis of pathloss measurements and/or other UL radio capacities. With these handover settings, the handover is controlled to be accomplished to a BS which offers the highest UL radio capacity to the UE, e.g., in terms of lowest pathloss and/or highest amount of available UL radio resources.

According to a second example, the key traffic pattern corresponds to an DL oriented asymmetry, and handover settings to be applied when this key traffic pattern is detected are provided in a corresponding item of the handover settings table.

Accordingly, if the detected traffic pattern indicates an DL oriented asymmetry, the corresponding table item will be selected and the handover settings defined therein be applied. These handover settings may specifically define that the above-mentioned first mode of selecting the serving BS is to be applied. This may specifically mean that the serving BS is selected on the basis of RSRP measurements and/or other DL radio capacities. With these handover settings, the handover is controlled to be accomplished to a BS which offers the highest DL radio capacity to the UE, e.g., in terms of highest RSRP and/or highest amount of available DL radio resources.

The above key traffic patterns may be further subdivided on the basis of additional parameters, e.g., on the basis of throughput. For example, besides the orientation of the asymmetry, the data rate may be used to define the key traffic pattern. In this way, a UE with higher UL/DL data rate could be provided with corresponding handover settings so that the handover can be controlled to be accomplished to a BS which offers a higher amount of available UL radio resources so as to increase the traffic bandwidth. Similarly, a UE with lower UL/DL data rate could be provided with corresponding handover settings so that the handover can be controlled to be accomplished to a BS which offers a lower amount of available UL/DL radio resources so as to decrease the traffic bandwidth.

When for a certain UE a key traffic pattern corresponding to a UL oriented asymmetry is detected, it is beneficial to use the handover settings as defined in the corresponding item of the handover settings table. When the traffic pattern of this UE changes to a DL oriented asymmetry, it is beneficial to change to the handover settings as defined in the table item corresponding to the DL oriented asymmetry.

According to a third example, the key traffic pattern corresponds to a load-based traffic pattern, and handover settings to be applied when this key traffic pattern is detected are provided in a corresponding item of the handover settings table.

Accordingly, if the detected traffic pattern matches certain load criteria, the corresponding table item will be selected and the handover settings defined therein be applied. Such handover settings may be designed in order to keep a good load balance between different BSs. For this purpose, a load value for the UE may be calculated in terms of UL or DL interference, power consumption, data throughput, or the like. The load value may then be compared to values as defined for the key traffic pattern. The handover settings for the load-based traffic pattern may for example involve using DL and/or UL radio capacities as well as cell load information as a basis for selecting the serving BS. In this way, a UE with high load requirement may be handed over to a BS with more load room, with less interference to neighboring BSs. If a UE generates a high traffic load, using the handover settings corresponding to the load-based traffic pattern may be beneficial, e.g., in terms of load balancing between different BSs.

By means of the handover settings table, the handover settings for a UE can be efficiently adapted to different traffic patterns of the UE. This may be accomplished statically for different types of UE, but also dynamically as the traffic pattern of the UE changes. In this way, utilization of system resources and/or performance can be improved.

Figure 4:
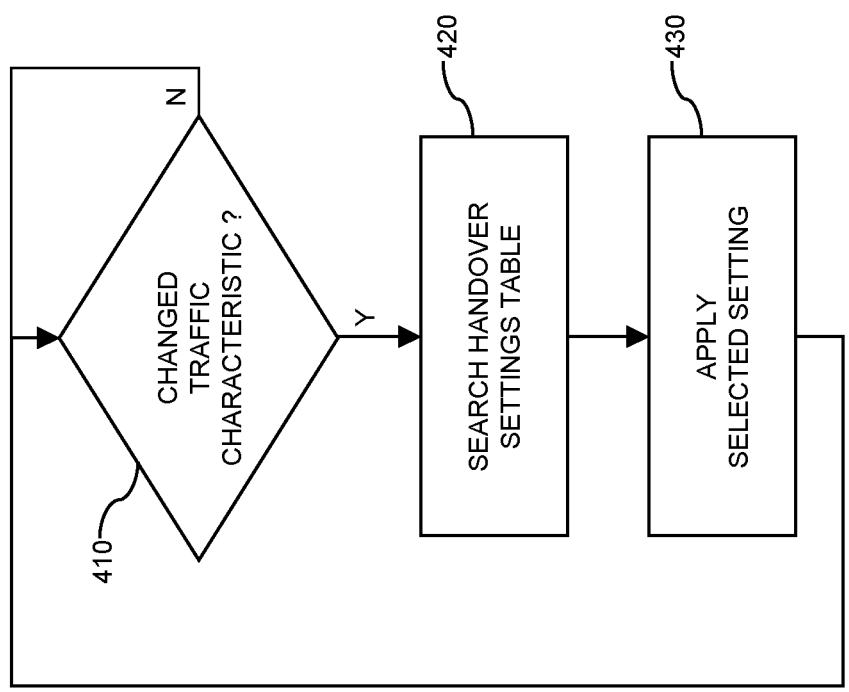
FIG. 4 shows a flowchart for illustrating a further method which may be used in an embodiment of the invention.

An example of a method using dynamic adaptation of the handover settings is illustrated in FIG. 4.

At step 410 of this method, it is determined whether a traffic characteristic of a UE has changed, e.g., form DL oriented asymmetry to UL oriented asymmetry or vice versa. This determination may for example be accomplished by the present serving BS of the UE. If the traffic characteristic has not changed, as indicated by branch "N", the method returns to repeat step 410. If the traffic characteristic has changed, as indicated by branch "Y", a search in the handover setting table is triggered at step 420. In this search, the changed traffic characteristic is used to find a matching key traffic pattern and corresponding table item in the handover settings table.

At step 430, the handover settings from this table item are selected and applied to be used for future handover procedures.

Figure 5:
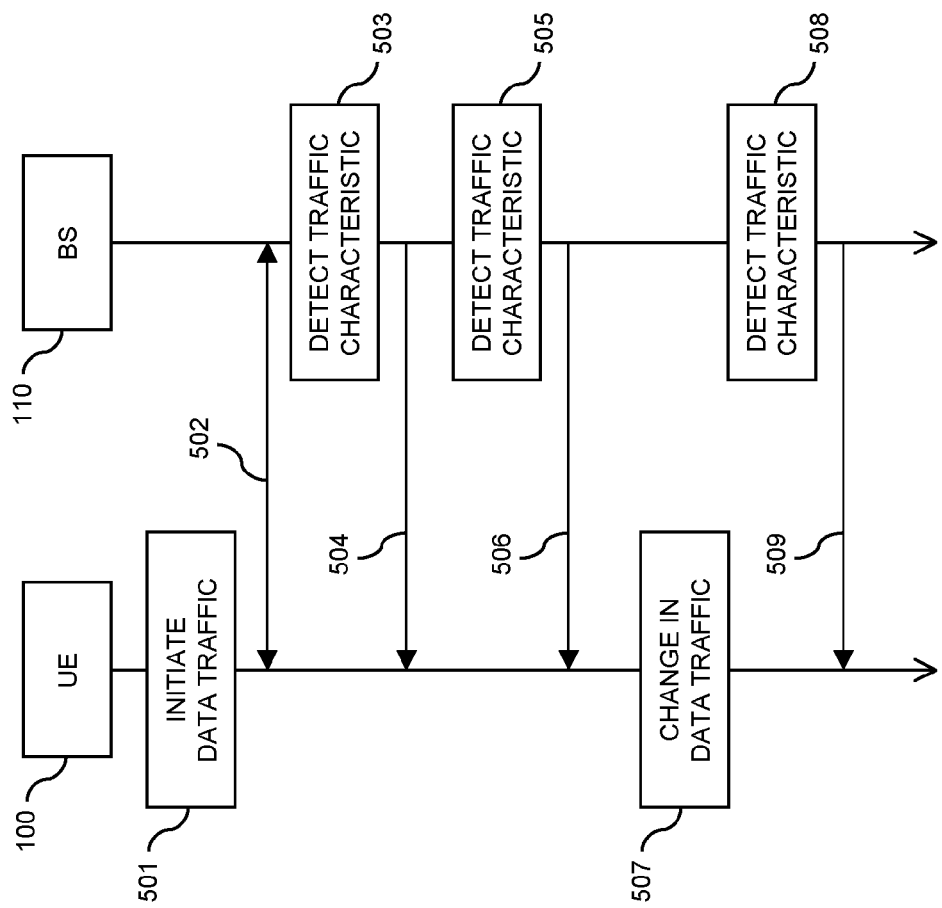
FIG. 5 shows a signaling diagram of an exemplary process in which handover settings are determined in accordance with an embodiment of the invention.

In the following, an exemplary scenario of applying different handover settings on the basis the handover settings table will be explained in connection with FIG. 5. In FIG. 5, it is assumed that the handover settings table is located at the BS 110, and the BS 110 detects one or more traffic characteristics in order to identify a key traffic pattern defined in the handover settings table.

At step 501, the UE 100 initiates data traffic, e.g., in order to use a certain service. Subsequently, as illustrated at 502, radio resources may be negotiated between the UE 100 and the BS 110, e.g., to setup a radio bearer with a certain QCI.

At step 504, the BS 110 determines a traffic characteristic, e.g., the asymmetry value AV as described above. The BS 110 may use information received while negotiating the radio resources for determining the traffic characteristic, e.g., a QCI. The determined traffic characteristic may be used as input to identify a table item in the handover settings table. The BS 110 may then select the corresponding handover settings from this table item to be applied for controlling handover procedures of the UE 100. By message 504, the UE 100 may be informed of the selected handover settings. For example, this may be accomplished by using a modified RRC signaling message, e.g., an RRC reconfiguration message.

At some time, as indicated by step 505, the BS 110 may again determine the traffic characteristic, e.g., by performing measurements on DL and/or UL data traffic of the UE 100. This may result in the detected traffic characteristic matching a different key traffic pattern, and the BS 110 may obtain corresponding updated handover settings from the handover settings table. By message 506, the UE 100 may be informed of the updated handover settings. As in the case of message 504, a modified RRC signaling message, e.g., an RRC reconfiguration message may be used for this purpose.

At 507, the data traffic generated by the UE 100 is assumed to change, e.g., due to a certain event related to the service used at the UE 100, such as starting of data download to the UE 100. This may be detected by the BS 110 at step 508, e.g., by performing measurements on DL and/or UL data traffic of the UE 100. This may result in the detected traffic characteristic matching a different key traffic pattern, and the BS 110 may obtain corresponding updated handover settings from the handover settings table. By message 509, the UE 100 may be informed of the updated handover settings. As in the case of message 504, a modified RRC signaling message, e.g., an RRC reconfiguration message may be used for this purpose.

Application of new handover settings in the processes of FIGS. 4 and 5 may in particular involve switching between the first mode and the second mode of selecting the serving BS.

Figure 6:
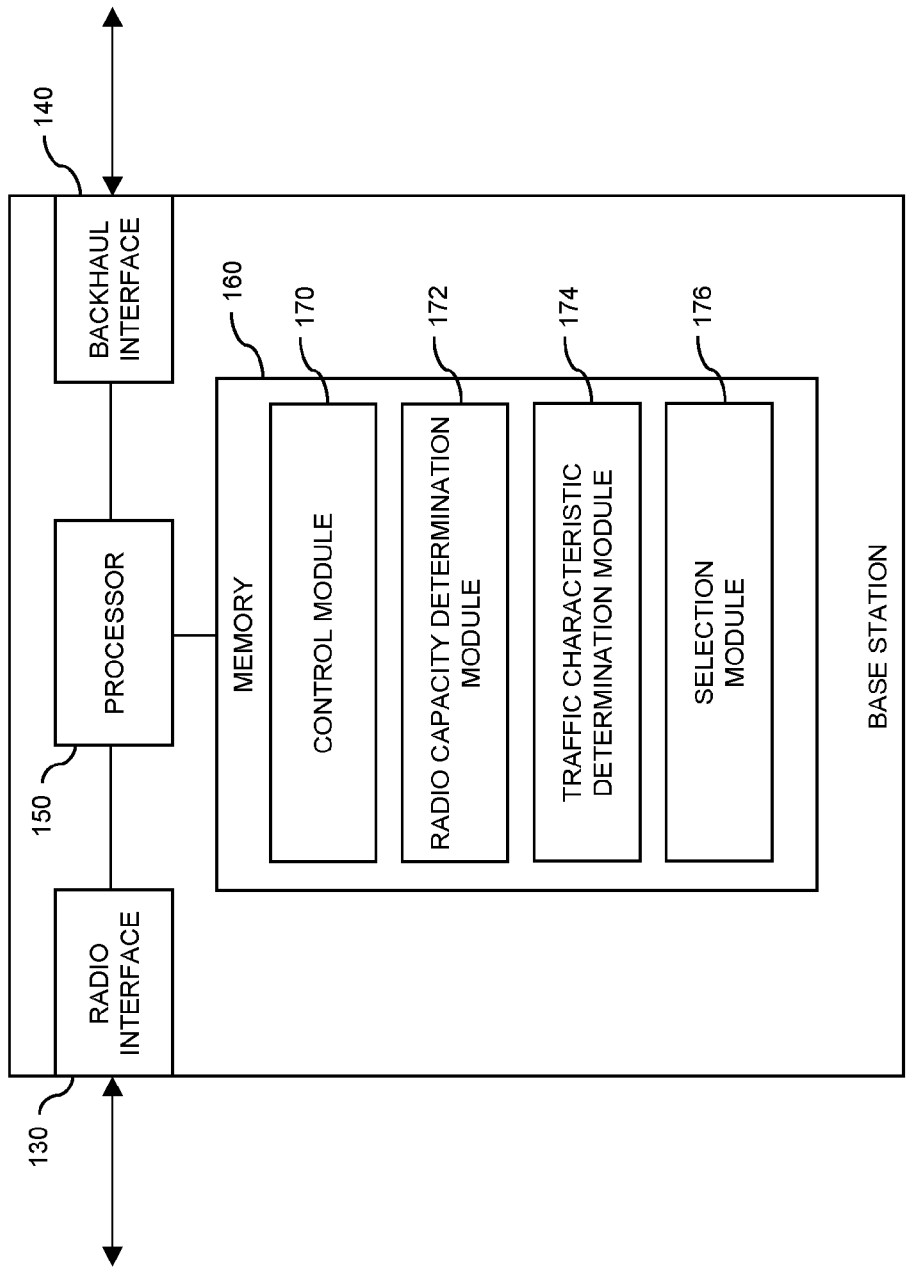
FIG. 6 schematically illustrates a base station according to an embodiment of the invention.

FIG. 6 schematically illustrates exemplary structures for implementing the above-described concepts in a BS, e.g., in the BS 110 of FIGS. 1, 2, and 5 or in the BS 120 of FIGS. 1 and 2.

In the illustrated structure, the BS includes a radio interface 130 for transmitting DL transmissions and/or for receiving UL transmissions. Such DL and UL transmissions may include user plane data, but also control data, such as measurement reports or buffer status reports. It is to be understood that for implementing transmit functionalities the interface 130 will include one or more transmitters, and that for implementing receive functionalities the interface 130 will include one or more receivers. The interface 130 may correspond to the Uu radio interface according to 3GPP LTE. The interface 130 is capable of receiving and decoding UL transmissions not only from UEs served by the BS, but also from UEs served by another BS. Further, the BS may includes a backhaul interface 140. The backhaul interface 140 may for example be used for communicating with one or more other BSs when initiating a handover of a UE.

Further, the BS includes a processor 150 coupled to the interface 130 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the BS 110. More specifically, the memory 160 may include a control module 170 for controlling communication with respect to one or more UE, e.g., the UE 100 of FIGS. 1, 2, and 5. Further, the memory 160 may include a DL radio capacity determination module 172 for determining DL and UL radio resources to be used in the above first and second mode of selecting the serving BS. The DL and UL radio capacities may for example include RSRP values or pathloss values. Further, the memory 160 may also include a traffic characteristic determination module 174 for determining a traffic characteristic to be used as a basis for selecting between the first mode and the second mode. As mentioned above, the traffic characteristic may for example be indicative of an asymmetry between DL data traffic and UL data traffic of a UE. Further, the memory 160 may also include a selection module 176 for identifying or selecting transition UEs and/or for selecting a serving BSs of a UE using the above-mentioned first or second mode. That is to say, the selection module 176 may configure the processor 150 to perform selection of the serving BS either according to the first mode or according to the second mode. The memory 160 may also be used for providing one or more DL buffer for storing data to be transmitted to a certain UE. As mentioned above, the fill level of such a DL buffer may be used as input by the traffic characteristic determination module.

It is to be understood that the structure as illustrated in FIG. 6 is merely schematic and that the BS may actually include further components which, for the sake of clarity, have not been illustrated, e.g., further interfaces. Also, it is to be understood that the memory 160 may include further types of program code modules, which have not been illustrated. For example, the memory 160 may include program code modules for implementing typical functionalities of a BS. According to some embodiments, also a computer program product may be provided for implementing concepts according to embodiments of the invention, e.g., a computer-readable medium storing the program code and/or other data to be stored in the memory 160.

As can be seen, by using the above described concepts balancing of DL performance and UL performance in a heterogeneous network can be achieved. This can be implemented in a manner which is transparent to the UE and without excessive impact on existing technologies.

It is to be understood that the examples and embodiments as explained above are merely illustrative and susceptible to various modifications. For example, the concepts could be used in other types of mobile communication network. For example, the concepts may not only be used in heterogeneous network deployments using Macro and Pico BSs, but also in heterogeneous network deployments alternatively or additionally using so called Femto Cells or Micro Cells. Further, the concepts may also be applied in homogeneous network deployments in which imbalances between DL and UL connections may occur for other reasons. Further, it is to be understood that the above concepts may be implemented by using correspondingly designed software in existing BSs, or by using dedicated hardware in the BSs.

The invention claimed is:

1. A method of selecting a base station to be used as a serving base station of a mobile terminal, the method comprising:
   determining a traffic characteristic of the mobile terminal;
   wherein determining the traffic characteristic comprises:
      determining a first fill level of a buffer for storing downlink data to be transmitted to the mobile terminal;
      determining a second fill level of a buffer for storing uplink data to be transmitted from the mobile terminal;
      determining the traffic characteristic from the first fill level and the second fill level;
   selecting, based on the traffic characteristic, between:
      a first mode in which the base station to be used as the serving base station is selected based on the selected base station's downlink radio capacity as compared to one or more other base stations;
      a second mode in which the base station to be used as the serving base station is selected based on the selected base station's uplink radio capacity as compared to one or more other base stations.

2. The method of claim 1, wherein the traffic characteristic of the mobile terminal indicates an asymmetry between uplink data traffic of the mobile terminal and downlink data traffic of the mobile terminal.

3. The method of claim 2, further comprising selecting the first mode in response to the traffic characteristic of the mobile terminal indicating a downlink oriented asymmetry.

4. The method of claim 2, further comprising selecting the second mode in response to the traffic characteristic of the mobile terminal indicating an uplink oriented asymmetry.

5. The method of claim 2, further comprising:
   determining an amount of downlink data transmitted to the mobile terminal during a period of time;
   determining an amount of uplink data transmitted from the mobile terminal during the period of time;

wherein the determining the traffic characteristic further comprises determining the traffic characteristic also from the amount of downlink data and the amount of uplink data.

6. The method of claim 5, wherein the period of time is longer than 20 milliseconds.

7. The method of claim 1, further comprising:
averaging the first fill level;
averaging the second fill level;
determining the traffic characteristic from the averaged first fill level and the averaged second fill level.

8. The method of claim 1, further comprising:
normalizing the first fill level with a downlink data rate that can be achieved for transmission of the downlink data to the mobile terminal;
normalizing the second fill level with an uplink data rate that can be achieved for transmission of the uplink data from the mobile terminal;
determining the traffic characteristic from the normalized first fill level and the normalized second fill level.

9. The method of claim 8, further comprising:
further normalizing the first fill level with a downlink resource utilization value of the mobile terminal;
further normalizing the second fill level with an uplink resource utilization value of the mobile terminal.

10. The method of claim 1, further comprising:
receiving a buffer status report from the mobile terminal;
determining the second fill level from the buffer status report.

11. The method of claim 2, further comprising:
detecting a quality of service class of a service used at the mobile terminal;
determining the asymmetry between uplink data traffic of the mobile terminal and downlink data traffic of the mobile terminal from the quality of service class.

12. The method of claim 1, wherein the downlink radio capacity is based on a received signal power of a signal transmitted from the base station to the mobile terminal.

13. The method of claim 1, wherein the downlink radio capacity is based on an amount of downlink radio resources which are available at the base station.

14. The method of claim 1, wherein the uplink capacity is based on a pathloss of a signal transmitted from the mobile terminal to the base station.

15. The method of claim 1, wherein the uplink radio capacity is based on an amount of uplink radio resources which are available at the base station.

16. The method of claim 1, further comprising initiating handover of the mobile terminal to the base station selected to be used as the serving base station.

17. A base station, comprising:
a radio interface to send downlink transmissions to a mobile terminal and to receive uplink transmissions from the mobile terminal;
a processor configured to select a base station to be used as a serving base station of the mobile terminal, wherein the processor is configured to:
determine a traffic characteristic of the mobile terminal;
wherein determining the traffic characteristic comprises:
determining a first fill level of a buffer for storing downlink data to be transmitted to the mobile terminal;
determining a second fill level of a buffer for storing uplink data to be transmitted from the mobile terminal;
determining the traffic characteristic from the first fill level and the second fill level;
select, based on the traffic characteristic, between:
a first mode in which the processor is configured to select the base station to be used as the serving base station based on the selected base station's downlink radio capacity as compared to one or more other base stations;
a second mode in which the processor is configured to select the base station to be used as the serving base station based the selected base station's uplink radio capacity as compared to one or more other base stations.

18. The base station of claim 17, wherein the traffic characteristic of the mobile terminal indicates an asymmetry between uplink data traffic of the mobile terminal and downlink data traffic of the mobile terminal.

19. A computer program product stored in a non-transitory computer readable medium for controlling a base station, the computer program product comprising software instructions which, when run on a processor of the base station, causes the processor to:
determine a traffic characteristic of the mobile terminal;
wherein determining the traffic characteristic comprises:
determining a first fill level of a buffer for storing downlink data to be transmitted to the mobile terminal;
determining a second fill level of a buffer for storing uplink data to be transmitted from the mobile terminal;
determining the traffic characteristic from the first fill level and the second fill level;
select, based on the traffic characteristic, between:
a first mode in which the base station to be used as the serving base station is selected based on the selected base station's downlink radio capacity as compared to one or more other base stations;
a second mode in which the base station to be used as the serving base station is selected based on the selected base station's uplink radio capacity as compared to one or more other base stations.

* * * * *